United States Patent [19]
Case et al.

[11] 3,918,033

[45] Nov. 4, 1975

[54] SCR MEMORY CELL

[75] Inventors: Jerry R. Case, Boulder; Donald L. Millican, Longmont; David E. Norton, Boulder, all of Colo.

[73] Assignee: International Business Machines Corporation, Armonk, N.Y.

[22] Filed: Nov. 11, 1974

[21] Appl. No.: 522,659

[52] U.S. Cl. .......... 340/173 R; 307/238; 307/317 R

[51] Int. Cl.$^2$ .......... G11C 11/40

[58] Field of Search ..... 340/173 R; 307/238, 317 R, 307/284

[56] References Cited

UNITED STATES PATENTS 3,697,962 10/1972 Beausoleil .......... 340/173 R

*Primary Examiner*—Terrell W. Fears
*Attorney, Agent, or Firm*—Herbert F. Somermeyer

[57] ABSTRACT

A bistable memory cell (stores one binary digit or bit) suitable for semiconductive memories includes a single SCR and a single transistor plus unique interconnections to provide a read-while-write array of such cells. The cell topology provides a small cell size with low stand-by power. The SCR provides a memory function, while the single transistor provides an output function. In an alternative embodiment, a second transistor is employed for controlling writing into the cell.

18 Claims, 12 Drawing Figures

SCR MEMORY CELL

BACKGROUND OF THE INVENTION

The present invention relates to semiconductive memories, particularly to those memories employing silicon-controlled rectifiers or thyristors.

Monolithic or semiconductive memory requirements include small cell or storage areas, plus low standby or memory maintaining current. The small cell size is desired for maximizing storage density, hence reducing cost. The low standby current is necessary to ensure that high power dissipation does not create excessive heat within the semiconductive memory. That not only requires larger power supplies, but also that the generated heat be appropriately dissipated, both adding to costs of operation and manufacture.

Utilization of an SCR (Silicon Controlled Rectifier) in a semiconductive memory cell is advantageous in that very few semiconductor regions are employed for obtaining the thyratron action of latching the circuit into one of two bistable states for storing a binary digit. The use of transistor elements as opposed to SCR's requires a greater plurality of semiconductive elements, thereby increasing minimum cell size.

Problems have been encountered in reliably and rapidly writing a bit in SCR memory cells. For recording a "0" bit, the SCR must be extinguished; i.e., made electrically nonconductive. Usually, such extinguishing action is slow. The time required to extinguish an SCR can be reduced by making it smaller and using fewer circuit elements to reduce capacitive effects.

When such semiconductive memories are employed for buffers for increasing the rate of data transfer, it is desirable to write in one word of the array while simultaneously reading the informational content from another word in that array. In addition, when applied in an array logic application, each cell in such array must be electrically isolated from other cells in the array.

SUMMARY OF THE INVENTION

It is an object of the present invention to provide an SCR type memory cell having a minimal number of components and, hence, a minimal size in a monolithic array.

In accordance with the invention a two-state memory circuit or cell includes a semiconductive thyratron or silicon-controlled rectifier circuit element (or transistor equivalent) having four semiconductive zones of alternating opposite semiconductive conductivity. Electrical power is supplied to a first one of the zones which also acts as an anode output of the circuit element. Two of the zones are control zones and are disposed intermediate the first and fourth zones, the fourth zone being a cathode output portion of the circuit element. An output transistor element has collector, base, and emitter portions. The base portion is connected to one of the output zones of the circuit element. There is further provided a resistive circuit element ohmically connecting one of the control zones of said thyratron circuit element to the nearest output zone. The cell is completed by read select means connected to the output transistor emitter portion, a sense output means connected to the collector portion, a write select means connected to the cathode zone, and a bit input means connected to one of said zones.

In one embodiment of the invention, the thyratron circuit element has two cathode zone connections, one to receive a write bit and the other to receive a write select signal. An anode zone is connected to the base portion of the output transistor element for supplying an electrical signal output through the transistor. In a second embodiment, a transistor element is electrically interposed between the write bit means and the control zone, the write select means actuates the input transistor for receiving an input bit. In this embodiment, only one cathode connection is made to the cathode zone.

In a third embodiment, which is also a double cathode connection embodiment, a single transistor element has a base portion connected to one of the cathode zones with the other cathode zone being connected to the bit input means, the read select means connected to the emitter portion of the output transistor with the sense output means being connected to the selector portion of the output transistor.

The above embodiments yield signal storage with low power consumption.

Yet other embodiments are within the scope of the generic invention disclosed herein.

The foregoing and other objects, features, and advantages of the invention will be apparent from the following more particular description of preferred embodiments of the invention, as illustrated in the accompanying drawing.

THE DRAWING

Figure 2:
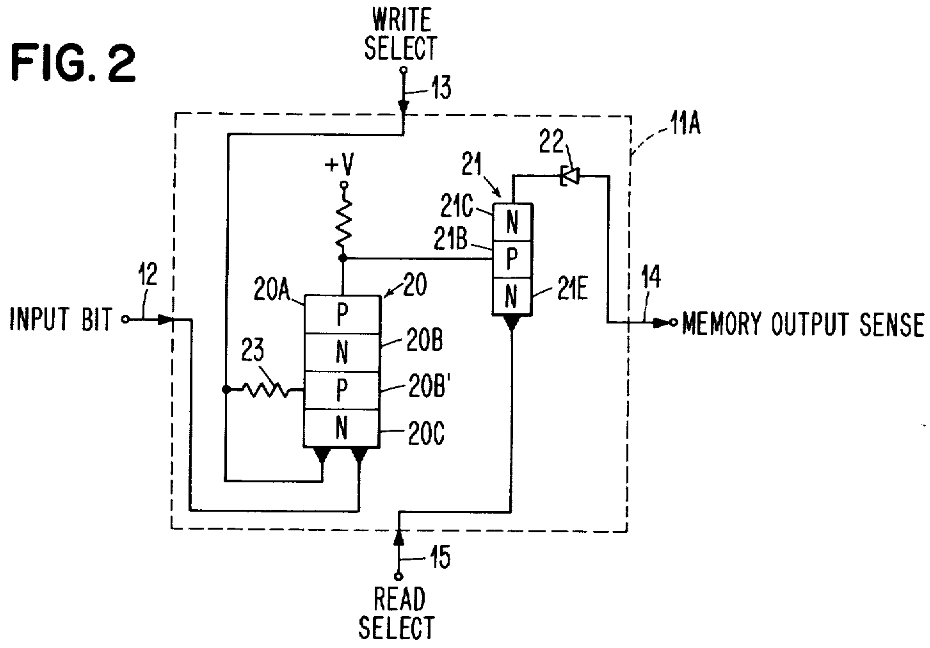
FIG. 2 is a circuit diagram of a first embodiment of the present invention.
Figure 2A:
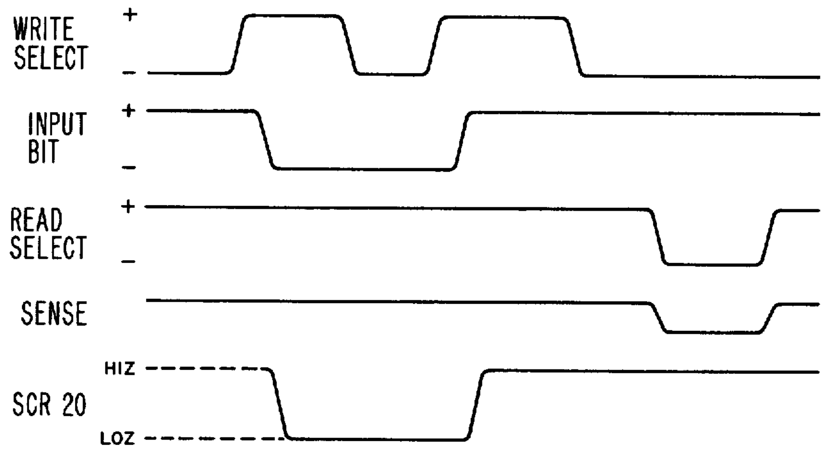
Figure 3:
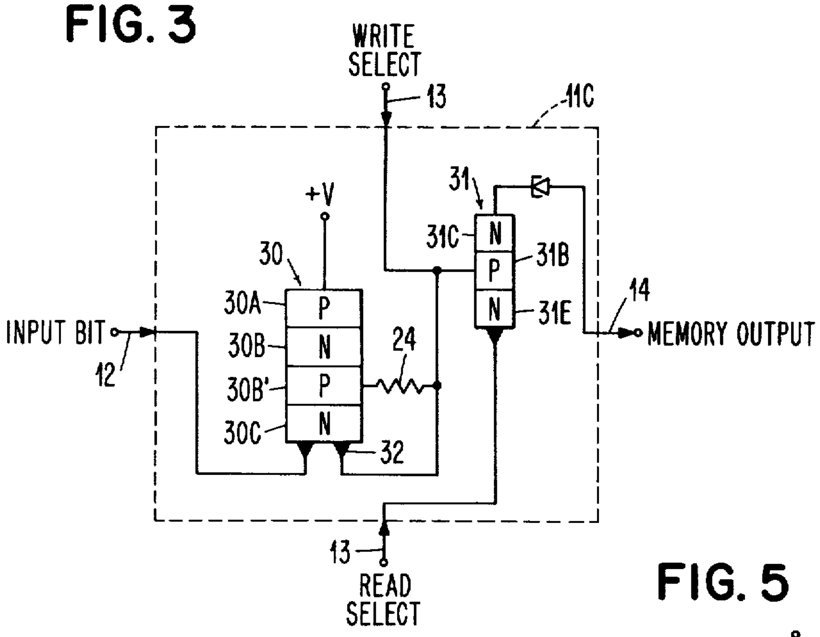
Figures 2B, 2C, 4:
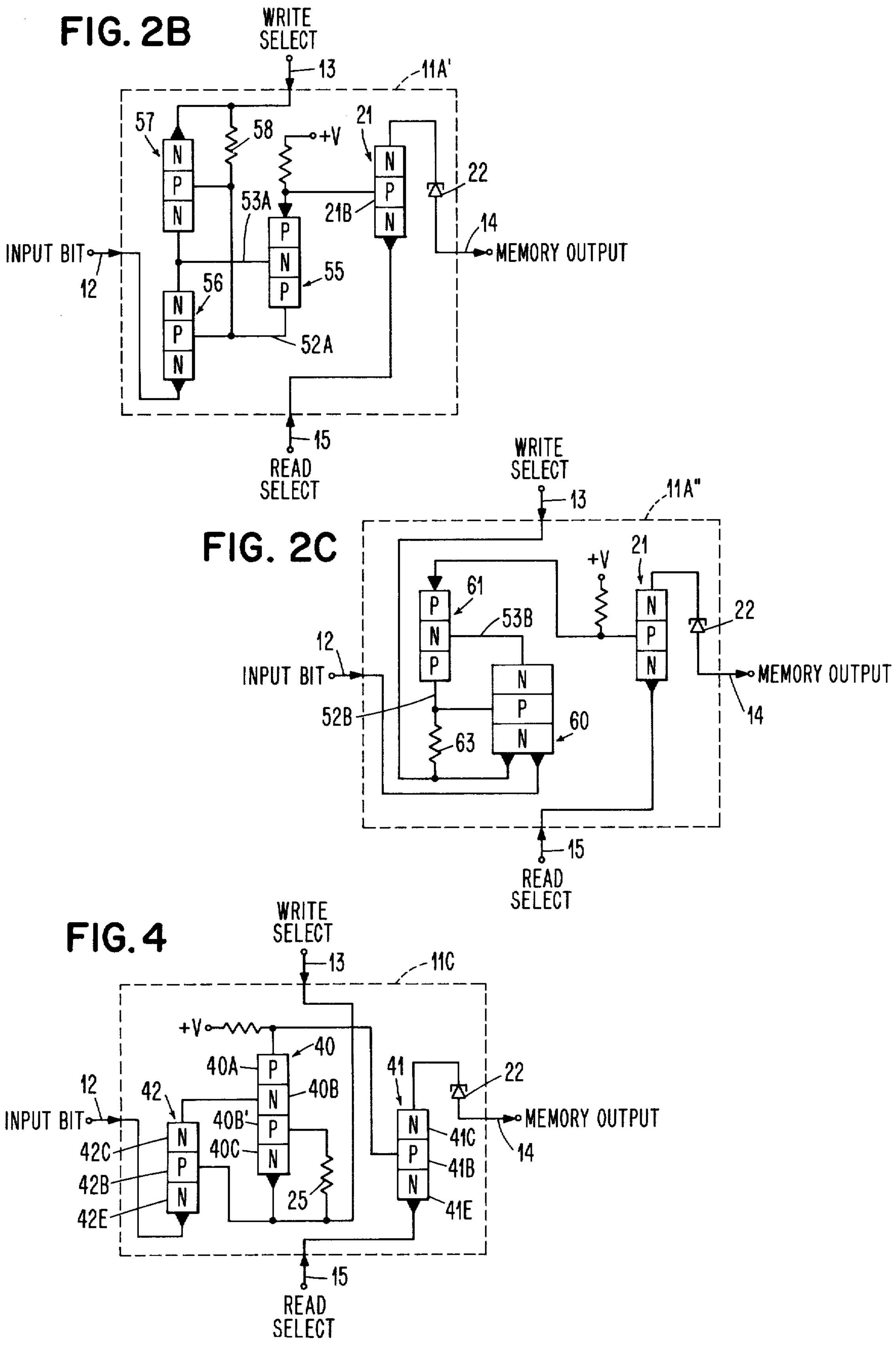

FIG. 2A has a set of idealized waveforms used to illustrate the operation of the FIGS. 2, 3, and 4 illustrated inventive memory circuits.

FIGS. 2B and 2C are circuit diagrams showing electrical equivalents of the FIG. 2 illustrated circuit.

FIG. 3 is a circuit diagram for a second embodiment of the present invention employing a dual cathode SCR element.

FIG. 4 is a circuit diagram of a memory cell employing the principles of the present invention using only a single cathode connection on the SCR, plus an input transistor element replacing a second cathode connection as used in the first two embodiments.

Figure 5:
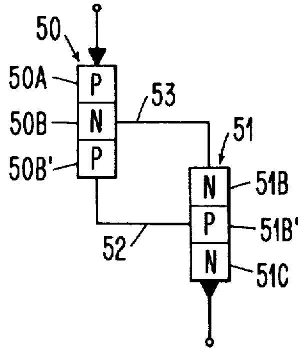

FIG. 5 is a circuit diagram of a two-transistor equivalent of an SCR.

Figures 6, 6A, 7, 7A:
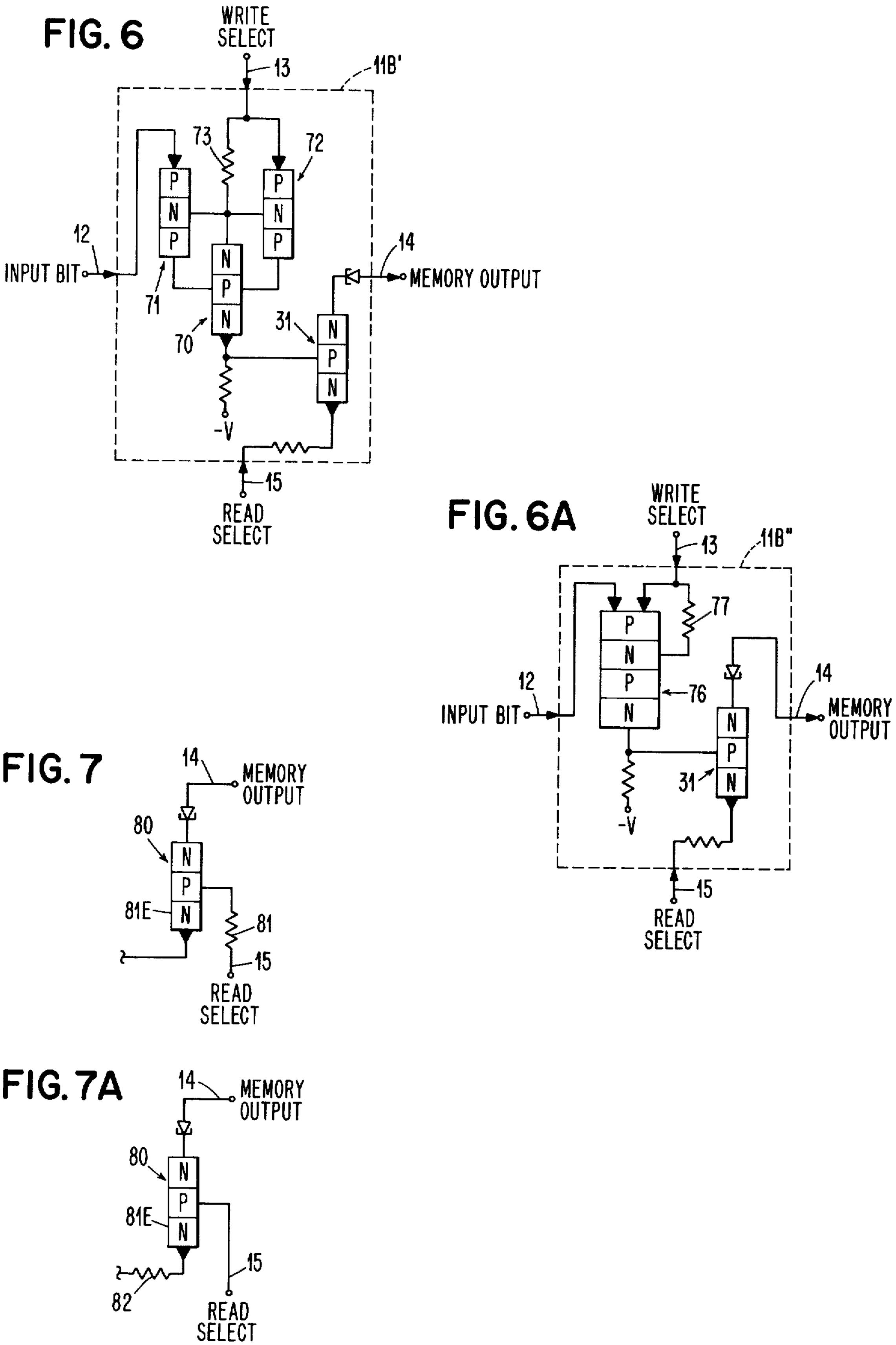

FIGS. 6 and 6A are two circuit diagrams of two "PNP" embodiments of the invention.

FIGS. 7 and 7A show two alternate output circuits usable with the illustrated memory cells.

DETAILED DESCRIPTION

Figure 1:
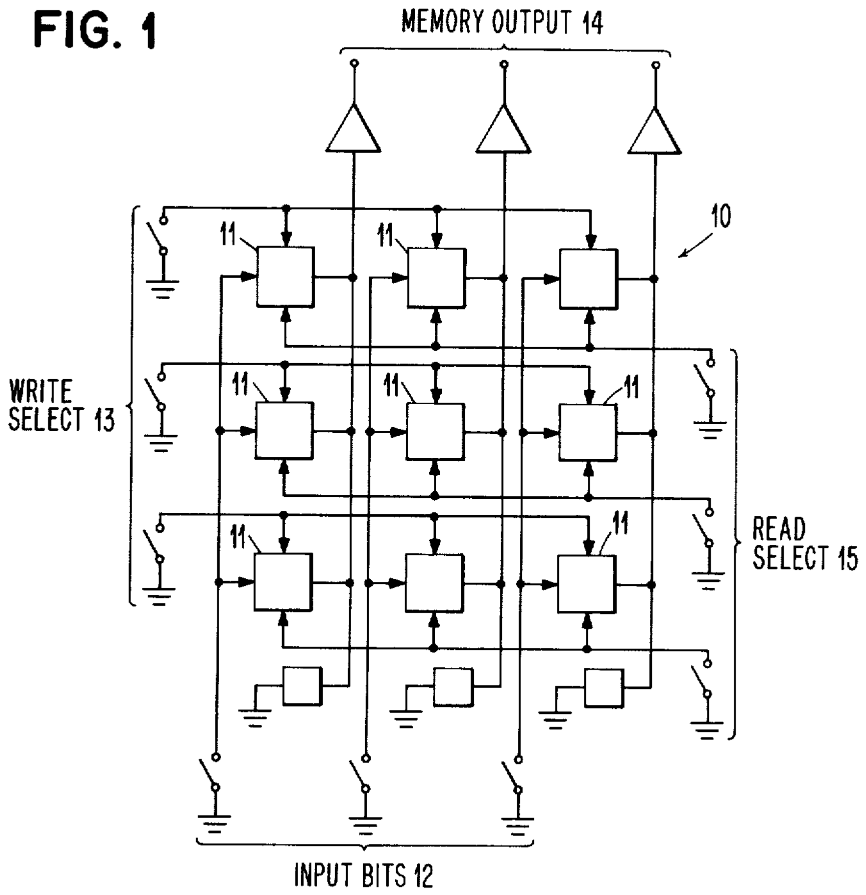
FIG. 1 is a simplified diagrammatic showing of a memory array of the read-while-write type which may employ the present invention.

Referring now particularly to the drawings, like numerals indicate like parts and structural features in the various diagrams. In FIG. 1, rectangular array 10 of bistable memory cells 11 constitutes a buffer memory which may be used for many purposes including functional logic within the array. Signals are inserted into the binary storage elements 11 from the input bits 12 which are represented as single-pole single-throw switches. To enable the recording operation, write select means 13 supplies a corresponding activating signal to the cells along the horizontal rows (words) to write bits received along the vertical columns. Memory output is over means 14 which includes suitable amplification and is activated by the read select lines 15 over the horizontal read select lines, again the actuation being diagrammatically illustrated by single-pole single-throw switches. Actual operation of a rectangular memory array 10 will become more apparent from an analysis of the memory cell circuits shown in FIGS. 2, 3, and 4. Control means (not shown) ensure that read and write selects activate different rows (words) within the array.

Referring particularly to FIG. 2, a memory cell 11A is shown in detail. A memory storage element is a silicon-controlled rectifier or thyristor 20 having four alternating zones of electrical conductivity, 20A being an anode zone, 20B and B′ being intermediate control zones, and 20C being a cathode zone. Cathode zone 20C is constructed to have separate cathode zones, one of which is to input bit line 12 and the second cathode connection is to write select line 13. Anode zone 20A is connected through a suitable resistor to a power supply +V. Signal output from memory SCR 20 is supplied through an output transistor element 21 having emitter, base, and collector portions 21E, 21B, and 21C, respectively. The emitter portion 21E is connected to read select line 15. The output of memory cell 11A is via Schottky barrier diode 22 (isolation diode) having its cathode connected to collector portion 21C and its anode connected to sense output line 14. Diode 22 may typically be formed by metalizing a high-resistivity semiconductor surface.

Operation of the FIG. 2 circuit is described with reference to the FIG. 2A signals. To write a bit in circuit 11A, write select line 13 receives a relatively positive signal to reversibly bias SCR 20 such that the input bit line signal will be captured and stored in SCR 20. For example, if the input bit line is positive, SCR 20 goes to current nonconduction; hence, a relatively positive signal is then supplied to base portion 21B. When input bit line 12 has a relatively negative voltage, SCR 20 becomes current conductive irrespective of the prior signal state of SCR 20 to supply a relatively negative signal to base portion 21B.

SCR 20 continuously supplies its output voltage either relatively positive or relatively negative (1 or 0) to base portion 21B. To read out the content of SCR 20 without altering its current conductive or its impedance state, read select line 15 becomes relatively negative such that the conductivity of SCR 20 controls the conductivity of output transistor 21. This action selectively transfers an information bearing signal through Schottky barrier diode to sense line 14. Line 14 receives the output signal as long as the read select signal is active. Shape of the output signal is also determined by the read select signal. When transistor 21 is nonconductive (SCR 20 conducting), no current flows to line 14 at any time.

Referring back now to FIG. 1, it is seen that each input bit switch connected to a line 12 is individually and respectively connected to the memory cells 11 in each of the rows, one switch per one memory cell to store an individual bit in each of the cells. In the write select and read select, all cells in a selected row respectively are actuated simultaneously. The array columns represent one bit in each word, whereas the horizontal rows correspond to one word.

Referring next to FIG. 3, a second embodiment 11B of the invention is shown wherein the electrical connections between a memory or storage SCR 30 and an output transistor 31 are from the cathode zones of the SCR to the base portion of the output transistor as opposed to the anode connections of FIG. 2. In a similar manner, SCR 30 has four zones 30A, 30B, 30B′ and 30C, same alphabetical suffixes indicating semiconductive zones of like function. Output transistor element 31 also has an emitter portion 31E, a base portion 31B, collector portion 31C. The sense write input bit, read select, and write select connections are as described for FIG. 1. Storage of a binary digit in SCR 30 is as described for FIG. 2. Continuous transfer of information form SCR 30 to output transistor 31 is from second cathode connection 32 to base portion 31B. In this instance, when SCR 30 is current conductive, a relatively positive voltage or current is supplied to base portion 31B. Whenever read select line 15 becomes relatively negative, output transistor 31 becomes conditionally current conductive; if SCR 30 is current conductive, then transistor 31 switches to current conductance to output an information bearing signal. On the other hand, if SCR 30 is in the current nonconductive state, no transistor driving current is supplied to base portion 31B leaving transistor 31 nonconductive with no resulting output signal. Hence, a signal output from output transistor 31 indicates a binary one is stored (SCR 30 is current conductive), whereas the absence of a pulse coincidentally with a read select line 15 being activated indicates a binary zero is stored (SCR 30 is current nonconductive).

Referring next to FIG. 4, a third embodiment 11C of the invention is shown wherein the storage SCR 40 has but one cathode connection. It has the four conductivity zones 40A, 40B, 40B′ and 40C as aforedescribed. Ouput transistor 41 has a collector portion 41C, base or control portion 41B, and an emitter portion 41E. As shown in this particular embodiment, base portion 41B of output transistor 41 is connected to the anode zone of SCR 40 and hence operates in the manner as described for FIG. 2. A difference between FIGS. 4 and 2 is in the write operation. An input bit signal supplied over input line 12 goes to the emitter portion 42E of input transistor 42. The collector 42C of transistor 42 is connected to control zone 40B of SCR 40. Write select line 13 is connected to the base portion 42B of input transistor 42 for transferring the current to the control zone 40B. In the event of the relatively positive signal in write select 13 as shown in FIG. 2A, input transistor 42 becomes current conductive. The current to zone 40B is determined by the polarity of the current in line 12. If there is substantial current, then 40B will be biased to cause SCR 40 to become current conductive. On the other hand, if the signal on line 12 is relatively positive, no current flows through input transistor 42. This results in a relatively positive voltage at zone 40B, hence casing SCR 40 not to become current conductive. It should be noted that the positive signal on write select line 13 tends to make SCR 40 current nonconductive; i.e., in the binary 0 state. In this manner, the signal on write select line 13 similarly controls SCR 40 via input transistor 42 in the same manner that the first two embodiments in FIGS. 2 and 3 received binary digit signals for storage via the two cathode zones of the storage SCR's 20 and 30. Electrically, the input transistor 42 and SCR 40 operate as a two cathode SCR equivalent.

For maintaining a current nonconduction state of the SCR's 20, 30, and 40, a suitable resistor is connected between the B′ control zone and a cathode connection, such as resistors 23, 24, and 25, respectively. This resistor connection makes the memory circuit more insensitive to noise signals which could switch the SCR to current conduction.

When practicing the present invention using large-scale integration, such that an entire array 10 is constructed on one semiconductor chip, the memory SCR's are constructed preferably using two interconnected transistor structures, as shown in FIG. 5. The FIG. 5 circuit acts as an SCR in the same manner as a discrete SCR with only four zones operates. The first transistor 50, a PNP Type, and a second transistor 51, an NPN type, with indicated ohmic interconnections 52 and 53 act as a single integrated circuit element. Portion 51C of second transistor 51 corresponds to the cathode connections 20C, 30C, and 40C of the prior described circuits. Portion 50A of first transistor 50 corresponds to the anode portion 20A, 30A, and 40A. The base or control zones of the thyristors 20, 30, and 40 respectively consist of ohmically interconnected base portion 50B with collector portion 51B (control zones 20B, 30B, and 40B), and collector portion 50B' with base portion 51B' (control zones 20B', 30B', and 40B'). It is believed that the element construction shown in FIG. 5 is easier to construct than a pure SCR when integrated circuits are used to implement the invention. Examples of plural transistor implementation of the thyristor memory circuit are shown in FIGS. 2B and 2C, such circuits operating identically from an electrical view as the circuit illustrated in FIG. 2.

Referring to FIG. 2B, cell 11A' includes output transistor 21 and isolation diode 22 as shown in FIG. 2. Memory SCR 20 is replaced by the three transistors 55, 56, and 57. The emitter portion of transistor 55 is connected through a suitable load resistor to +V. The output signal connection is to the base portion 21B of output transistor 21. The collector portion of PNP transistor 55 is ohmically connected over line 52A to the bases of transistors 56 and 57 in the same manner that ohmic connection 52 connected to the base portion 51B' is connected to collector portion 50B'. Since the FIG. 2 illustrated circuit has a dual cathode SCR, transistors 56 and 57 provide the same function, both corresponding to two second transistors 51 of FIG. 5. The thyristor connection of the three transistors is completed by line or ohmic connection 53A extending between the base of PNP transistor 55 and the collector portions of transistors 56 and 57. Resistor 58 corresponds to resistor 23 of FIG. 2. Operation of the FIG. 2B illustrated circuit is as described for FIG. 2, taking into account the thyristor connection of two transistors shown in FIG. 5.

FIG. 2C illustrates circuit 11A'' having two emitter transistor 60 replacing the two transistor elements 56 and 57. Transistor 60 is in a thyristor connection with first transistor 61. Resistor 63 corresponds to resistor 23 of FIG. 2. Ohmic connections 53B and 52B correspond favorably to the ohmic connections 53 and 52, respectively, of FIG. 5.

FIGS. 6 and 6A, respectively, show PNP embodiments 11B' and 11B'' which perform the same functions as the FIG. 3 illustrated embodiment 11B; i.e., the output transistor is emitter or cathode driven by the memory circuit element, either thyristor connected transistors or a PNPN type of thyristor element. In FIG. 6, transistor 70 corresponds to transistor 50 of FIG. 5; while transistors 71 and 72 are a dual anode equivalent of second transistors 51. Resistor 73 corresponds to resistor 24 of FIG. 3. Except for voltage polarities, operation is as described for FIG. 3. Also, an NPNP SCR may be substituted for a PNPN SCR 30 with equal results, voltage polarities being changed accordingly.

In FIG. 6A, dual anode PNPN SCR 76 is shown in its preferred circuit connection with stabilizing resistor 77 corresponding to resistor 34 of FIG. 3. Operation is as described for FIG. 3 except for the voltage polarities.

FIGS. 7 and 7A show two other output transistor connections wherein the emitter portion of the output transistor is connected to the memory SCR. Output transistor 80 of FIG. 7 has its base portion connected through a current-limiting resistor 81 to read select 15. Its emitter portion 81E is connected to the memory SCR of any of the above-described embodiments. The memory output is as described before, it being understood that the signal amplitudes on the read select lines 15 and that provided by the SCR's are matched to operate output transistor 80 as a switch, as aforedescribed. FIG. 7A is a modification of FIG. 7 in that a current-limiting resistor 82 is connected to the emitter connection 81E of output transistor 80 rather than in the read select connection. Operation of the FIG. 7A circuit is exactly as described for FIG. 7.

While the invention has been particularly shown and described with reference to a preferred embodiment thereof, it will be understood by those skilled in the art that various changes in form and details may be made therein without departing from the spirit and scope of the invention.

What is claimed is:

1. A two-state memory circuit, including in combination:

a semiconductive thyratron circuit element having four semiconductive zones of alternating opposite semiconductive conductivity;

a first one zone being an anode output zone of said semiconductive thyratron circuit element;

two of said zones being control zones, and a fourth one of said zones being a cathode output zone of said semiconductive thyratron circuit element;

power supply terminal means connected to one of said output zones;

an output transistor element having collector, base control, and emitter control portions;

a first one of said control portions being connected to a given one of said output zones;

a resistive circuit element ohmically connecting one of said control zones to said cathode output zone;

read select means electrically connected to a second one of said control portions;

sense output means electrically connected to said collector portion;

write select means electrically connected to said cathode output zone; and bit input means electrically connected to one of said zones other than said anode output zone.

2. The two-state memory circuit set forth in claim 1 wherein said cathode output zones have first and second cathode connection means;

said first cathode connection means being connected to said write select means and said resistive element; and said second cathode connection means being connected to said bit input means.

3. The two-state memory circuit set forth in claim 2 wherein:

said base control portion being said first control portion and being ohmically connected to said anode output zone; and a power supply resistive element being electrically interposed between said anode output zone and said power supply terminal means.

4. The two-state memory circuit set forth in claim 2 further including a Schottky barrier diode in said sense output means and having a cathode portion ohmically connected to said collector portion and having an anode portion as an output connection for said two-state memory circuit.

5. The two-state memory cell set forth in claim 2 wherein said base control portion is said first control portion and being ohmically connected to said first cathode connection means.

6. The two-state memory cell set forth in claim 2 further including second resistive means electrically interposed between said emitter portion and said read select means, and third resistive means electrically interposed between said first cathode connection means and said write select means.

7. The two-state memory circuit set forth in claim 1 wherein said bit input means includes a second transistor element having collector, base control, and emitter control segments;

said collector segment ohmically connected to one of said control zones;

one of said control segments being ohmically connected to said cathode output zone; and a second one of said control segments being an input bit signal receiving circuit element.

8. A two-state memory circuit adapted for use in an array of such memory circuits including in combination:

A semiconductive thyratron element having a plurality greater than three of semiconductive zones of alternating and opposite semiconductive conductivity type, one of said zones being an anode end zone and another of said zones being a cathode end zone, and all other zones being intermediate to said end zones and being control zones;

an output transistor element having collector, emitter control, and base control portions;

the improvement including in combination:

a first one of said control portions being ohmically connected to a first one of said end zones;

power supply means electrically connected to a given one of said end zones;

a first select input conductor electrically connected to a second one of said control portions;

an output conductor electrically connected to said collector portion;

a second input conductor electrically connected to another of said end zones; and a second select conductor connection electrically connected to said another of said end zones, said other electrical end zone connections to said terminal being electrically independent.

9. The two-state memory circuit set forth in claim 8 further including an input transistor element having collector, base, and emitter segments, said collector segment being ohmically connected to one of said control zones, said emitter segment and said base segment being electrically interposed between said second input conductor and said cathode end zone such that said emitter segment is ohmically connected to said second input conductor and said base segment being ohmically connected to said cathode end zone.

10. The two-state memory set forth in claim 9 further including in combination:

said anode end zone being ohmically connected to said base portion and to said resistive element;

a Schottky barrier diode electrically interposed between said collector portion and said output conductor with the cathode end of said Schottky barrier diode being ohmically connected to said collector portion;

said first select input conductor being ohmically connected to said emitter control portion, said emitter control portion being said second one of said control portions;

said second select input conductor being ohmically connected to said cathode end zone; and a second resistive element electrically and ohmically interconnecting said cathode end zone with a first one of said other zones, said first one of said other zones being contiguous with and electrically interactive with said cathode end zone.

11. The two-state memory circuit set forth in claim 8 further including in combination:

said anode end zone being said one end zone and said given one end zone; and said cathode end zone having first and second electrically independent connection means, one of which is electrically connected to said second input conductor and a second one of which is electrically connected to said second select input conductor.

12. The two-state memory circuit set forth in claim 8 further including in combination:

said anode end zone being connected to said power supply means and being said given one of said end zones;

said cathode end zone ohmically connected to said first one of said control portions and being said first one of said end zones; and a resistive element ohmically interposed between one of said control zones and said one control portion.

13. The two-state memory circuit set forth in claim 8 further including in combination:

said first one of said control portions being ohmically connected to said cathode zone;

electrically resistive means electrically interposed between said cathode zone and said power supply means and said cathode zone being said given one of said end zones;

said anode end zone being said another end zone and having independent electrical connection thereto; and a resistive element electrically interposed between one of said control zones and said second select input conductor.

14. The two-state memory circuit set forth in claim 8 wherein said semiconductive thyratron element consists of a plurality of transistor elements, said elements comprising:

a first transistor element having collector and emitter of a first electrical conductivity type separated by a base of second and opposite electrical conductivity type semiconductive material;

a second transistor element having collector and emitter consisting of said second electrical conductivity type material separated by a base consisting of said first electrical conductivity type semiconductive material;

said first transistor element emitter being said anode end zone;

said second transistor element emitter being said cathode end zone; and means independently ohmically electrically connecting said base and collectors of said first and second transistor elements exhibiting like type semiconductive conductivities.

15. The two-state memory circuit set forth in claim 14 further including a third transistor element in said plurality of transistor elements and having a collector and emitter consisting of said second semiconductive type material separated by a base consisting of said first electrical conductivity type semiconductive material;

said base and collector of said third transistor element being independently and respectively ohmically connected to base and collector of said first and second transistor elements having the same semiconductive type material; and the emitter of said third transistor element being connected to said second input conductor and said emitter of said first transistor element being ohmically connected to said second select input conductor.

16. A two-state memory cell for use in an array of memory cells and including a thyristor type semiconductive element having anode and cathode end zones of opposite electrical semiconductive conductivity and two control zones of opposite semiconductive conductivities interposed between said end zones such that electrically adjacent zones have opposite semiconductive conductivities;

a transistor element having collector, base control, and emitter control portions;

an ohmic connection from said anode end zone to said base control portion;

said cathode end zone having first and second electrically independent connection means;

a resistive element electrically connecting said first connection means to one of said control zones electrically adjacent said cathode end zone;

a power supply terminal means;

a second resistive element electrically connecting said terminal means to said anode end zone;

input bit terminal means ohmically connected to said second connection means;

write select terminal means ohmically connected to said first connection means;

read select terminal means ohmically connected to said emitter control portion;

a Schottkey barrier diode element having a cathode end ohmically connected to said collector portion and an anode end; and cell output terminal means ohmically connected to said anode end.

17. The two-state memory cell set forth in claim 16 wherein said thyristor semiconductor element consists of a plurality of ohmically interconnected transistor elements and comprising:

a first transistor element having a collector and emitter of first semiconductive conductivity type material separated by a base of second and opposite semiconductive conductivity type material;

a second transistor element having a collector and emitter of said second conductivity type material separated by a base of said first conductivity type material;

said first transistor element emitter being said anode end zone;

said second transistor element emitter being said cathode end zone;

said first transistor element base being ohmically connected to said second transistor element collector and said first transistor element base ohmically connected with said second transistor element emitter being a first one of said control zones;

said first transistor element collector being ohmically connected to said second transistor element base, said first transistor element collector ohmically connected with said second transistor element base being a second one of said control zones; and said second transistor element emitter being said cathode end zone.

18. The two-state memory cell set forth in claim 17 further including a third transistor element in said plurality of transistor elements and having a collector and emitter of said second conductivity type material separated by a base of said first conductivity type material;

said third transistor element collector being ohmically connected to said first transistor element base;

said third transistor element base being ohmically connected to said first transistor element collector; and said third transistor element emitter and said second transistor element emitter jointly being said cathode end zone, and said first and second connection means being ohmically associated with said second and third transistor element emitters, respectively.

* * * * *